(12) United States Patent
Ye et al.

(10) Patent No.: US 8,819,358 B2
(45) Date of Patent: *Aug. 26, 2014

(54) DATA STORAGE DEVICE, MEMORY SYSTEM, AND COMPUTING SYSTEM USING NONVOLATILE MEMORY DEVICE

(71) Applicant: Samsung Electronics Co., Ltd., Gyeonggi-do (KR)

(72) Inventors: KyungWook Ye, Seoul (KR); Yul-Won Cho, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/770,107

(22) Filed: Feb. 19, 2013

(65) Prior Publication Data

US 2013/0173856 A1 Jul. 4, 2013

Related U.S. Application Data

(63) Continuation of application No. 12/256,275, filed on Oct. 22, 2008, now Pat. No. 8,380,945.

(30) Foreign Application Priority Data

Oct. 25, 2007 (KR) ........................ 10-2007-0107904

(51) Int. Cl.
*G06F 12/00* (2006.01)
*G06F 12/02* (2006.01)
(52) U.S. Cl.
CPC .... *G06F 12/0246* (2013.01); *G06F 2212/7207* (2013.01)
USPC .......................................... 711/156; 711/103

(58) Field of Classification Search
CPC ............ G06F 11/14–11/1497; G06F 12/0246; G06F 2212/2022; G06F 12/466; G06F 12/72–12/7211
USPC .......... 711/103, 173, 218, 154, 156, 161, 162
See application file for complete search history.

(56) References Cited

U.S. PATENT DOCUMENTS

| | | | |
|---|---|---|---|
| 5,930,167 A * | 7/1999 | Lee et al. .................. | 365/185.03 |
| 7,603,530 B1 * | 10/2009 | Liikanen et al. .............. | 711/162 |
| 2005/0144360 A1 | 6/2005 | Bennett et al. | |
| 2006/0085493 A1 * | 4/2006 | Kim et al. ..................... | 707/206 |

(Continued)

FOREIGN PATENT DOCUMENTS

| | | |
|---|---|---|
| KR | 1020020028624 | 4/2002 |
| KR | 1020030095438 | 12/2003 |

(Continued)

OTHER PUBLICATIONS

Pillai, Sarath, "Inode and its structure in linux," Slashroot.in, Dec. 1, 2012, Retrieved Dec. 30, 2013.*

(Continued)

*Primary Examiner* — April Y Blair
*Assistant Examiner* — Nicholas Simonetti
(74) *Attorney, Agent, or Firm* — F. Chau & Associates, LLC

(57) ABSTRACT

Provided is a data storage device including two or more data storage areas including may have two or more (heterogeneous) types of nonvolatile memory cells. At least one of the data storage areas includes a plurality of memory blocks that are sequentially selected, and metadata are stored in the currently selected memory block. The memory blocks can be sequentially used and metadata can be stored in a uniformly-distributed manner throughout the data storage device. Therefore, separate merging and wear-leveling operations are unnecessary. Thus, it is possible to improve the lifetime and writing performance of a data storage device having two or more heterogeneous nonvolatile memories.

18 Claims, 4 Drawing Sheets

(56) References Cited

U.S. PATENT DOCUMENTS

| | | | |
|---|---|---|---|
| 2006/0179083 A1* | 8/2006 | Kulkarni et al. | 707/204 |
| 2007/0025151 A1* | 2/2007 | Lee | 365/185.11 |
| 2007/0083697 A1* | 4/2007 | Birrell et al. | 711/103 |
| 2007/0260829 A1 | 11/2007 | Hallivouri | |
| 2008/0316819 A1 | 12/2008 | Lee | |

FOREIGN PATENT DOCUMENTS

| | | |
|---|---|---|
| KR | 1020060109042 | 10/2006 |
| KR | 20060130085 | 12/2006 |
| KR | 20070014470 | 2/2007 |
| KR | 20070096429 | 10/2007 |

OTHER PUBLICATIONS

Finlayson et al., Log Files: An Extended File Service Exploiting Write-Once Storage, Nov. 1987, ACM SIGOPS, vol. 21 Issue 5, pp. 139-148.

\* cited by examiner

DATA STORAGE DEVICE, MEMORY SYSTEM, AND COMPUTING SYSTEM USING NONVOLATILE MEMORY DEVICE

CROSS-REFERENCE TO RELATED APPLICATIONS

This application is a continuation of U.S. application Ser. No. 12/256,275 filed on Oct. 22, 2008, which claims priority under 35 U.S.C. §119 of Korean Patent Application No. 10-2007-0107904, filed on Oct. 25, 2007, the entire contents of both applications are incorporated by reference herein.

BACKGROUND OF THE INVENTION

1. Field of the Invention

The present invention disclosed herein relates to data storage devices, and more particularly, to a data storage device, a memory system, and a computing system using a nonvolatile memory device.

2. Description of the Related Art

Memory devices are generally divided into two classes: volatile memory devices and nonvolatile memory devices. The volatile memory devices are typically semiconductor memory devices that have a high read/write speed but lose stored data when power supply thereto is interrupted. On the other hand, the nonvolatile memory devices can retain stored data even when power supplied thereto is interrupted. Therefore, the nonvolatile memory devices are used to store data that must be retained regardless of power supply.

Examples of the nonvolatile semiconductor memory devices are mask read-only memories (MROMs), programmable read-only memories (PROMs), erasable programmable read-only memories (EPROMs), and electrically erasable programmable read-only memories (EEPROMs). Flash memory is a specific type of EEPROM (Electrically Erasable Programmable Read-Only Memory) that is erased and programmed in entire "blocks". Flash memories have a function of electrically erasing data of cells in a "batch" manner. Flash memories are widely used in computers and memory cards. Recently, flash memory has become the dominant technology wherever a significant amount of non-volatile, solid-state storage is needed. Common applications include PDAs (personal digital assistants), laptop computers, digital audio players, digital cameras and mobile phones. It has also gained popularity in the game console market, where it is often used instead of EEPROMs or battery-powered SRAM for game save data. High capacity flash memories are now widely used as primary computer data storage devices instead of hard disk drives.

In comparison with other memory devices, a flash memory is advantageous in that it can provide a high read speed at a relatively low unit cost. However, the flash memory is characterized by a block erase operation must be performed beforehand in order to write data therein and the block data erase time is greater than its data write time. These characteristics make it difficult to use the flash memory as a main system RAM (random access memory), and also hinders the use of a conventional hard-disk file system even when the flash memory is used as an solid state drive (SSD). Thus, a flash translation layer (FTL) is used between the file system and the flash memory to hide the erase operation of the flash memory. Flash memory devices are widely used not only as data storages but also as code storages that store data that must be retained regardless of power supply. Flash memory devices can be used for code storage in mobile devices (e.g., cellular phones, PDAs, digital cameras, portable game consoles, and MP3Ps) and also in home applications (e.g., HDTVs, DVD players, routers, and GPS units).

The flash translation layer (FTL) performs functions such as management of logical address-to-physical address mapping information, management of bad blocks, management of data protection against unexpected power interruption, and wear leveling. For example, in a write operation of the flash memory, the FTL serves to map a logical address, which is generated by the file system, to a physical address of the flash memory that has beforehand performed an erase operation. The FTL uses an address mapping table for rapid address mapping.

The flash translation layer (FTL) specification allows a flash device to look like a hard disk drive, but still have effective wear leveling. The address mapping function of the FTL enables a host to recognize a flash memory device as a hard disk drive (or as an SRAM) and to access the flash memory device in the same way as for the hard disk drive. Newer NAND flash chips have pages comprising 2048 bytes+ 64 bytes spare areas, and strict write requirements. Each block contains 32 pages. Each page within a memory block must be written to in sequential order, and each page must be written only once.

Recently, a data storage device, which includes at least two or more heterogeneous memory cells as illustrated in FIG. 1, was developed to solve both the performance/price problems of a data storage device. See, A Novel Memory Hierarchy for Flash Memory Based Storage Systems, by Keun Soo Yim, published in the Journal of Semiconductor Technology and Science Vol. 5 No. 4, 2005. 12. In such a data storage device having at least two or more heterogeneous memory cells as illustrated in FIG. 1 many types of flash memories (e.g., SLC and MLC flash memories) are used in order to reduce the overall storage cost. Write requests are classified into two types, "hot" and "cold", where hot data is vulnerable to be modified in the near future. Only hot data is stored in the faster SLC flash, while the cold data is kept in slower MLC flash, or in NOR flash. The cell characteristics of the SLCs and MLCs are closely related to the chip price and the frequency of occurrence of bad blocks. A window between adjacent program states (i.e., a state-to-state window) of an MLC is narrower than a window of an SLC. Also, a margin between the edges of a threshold voltage distribution and a voltage applied to a selected word line in a read operation further decreases as the window width decreases. Thus, the probability of invalid sensing due to a process variation or a change in the temperature, the operation voltage and the voltage level of a selected word line is higher in an MLC than in an SLC. Therefore, the SLC is superior to the MLC in storing, for example, BIOS (basis input/output system) data and font data that require good storage characteristics. On the other hand, the MLC is superior to the SLC in storing, for example, voice data that have no problem even in the event of a storage failure in one or some of a large quantity of consecutive data bits.

In a write operation, the FTL performs an address mapping operation of mapping a logical address generated by a file system to a physical address of a flash memory. The address mapping table managed by the flash translation layer (FTL) are stored in metadata format in one memory block of the flash memory device. As well known in the art, the full page address mapping method is better than a log block based address mapping method in terms of the write performance but generates two or more times the quantity of metadata to be managed than the log block based address mapping method. If metadata generated as a result of full page address mapping are stored in one or a few specific memory blocks, a program erase operation may be repeatedly performed on that specific memory block. This may reduce the lifetime of that specific memory block.

SUMMARY OF THE INVENTION

An aspect of the invention provides a data management method that effectively manages data in a nonvolatile memory device such as a flash memory device and improves the performance of a data storage device. An exemplary embodiments of the present invention perform the method and provide a data storage device capable of economically using two or more heterogeneous nonvolatile memories having wear leveling and supporting power interruption data recovery.

A data storage device according to an embodiment of the present invention includes two or more data storage areas each comprised of different nonvolatile memory cell types. At least one of the data storage areas includes a plurality of memory blocks that are sequentially selected in a round-robin fashion, and metadata are stored in the currently selected memory block, rather than in one predetermined memory block dedicated to metadata storage. In this embodiment, the memory blocks of the data storage device can be sequentially used and metadata can be stored in a uniformly-distributed manner. Therefore, separate merging/wear-leveling operations are unnecessary. Thus, it is possible to improve the lifetime and writing performance of a flash memory storage device.

Various embodiments of the present invention provide data storage devices including: a data storage device including two or more data storage areas including at least two or more heterogeneous nonvolatile memory cells, wherein at least one of the data storage areas includes a plurality of memory blocks that are sequentially selected, and user data and metadata corresponding to that user data are stored in the currently selected memory block.

Other embodiments of the present invention provide memory systems comprising: a data storage device comprising a first plurality nonvolatile memory blocks; and a controller configured to, dynamically select one of the first plurality nonvolatile memory blocks, and to store user data and metadata in the selected memory block.

Other embodiments of the present invention provide computing systems comprising: a central processing unit (CPU) connected to a system bus; a data storage device comprising a first plurality of memory blocks and a second plurality of nonvolatile memory blocks; and a controller connected to the host (CPU) through the system bus, and configured to dynamically select one of the first plurality of nonvolatile memory blocks and to store user data and metadata corresponding to that user data in the currently selected memory block.

In some embodiments, the memory blocks are sequentially selected in a round-robin fashion. In other embodiments, the selected memory block may be selected based upon considerations for wear leveling.

In other embodiments, user data, the metadata, and meta-management data (e.g., metadata-location data) for locating the metadata are stored in the selected memory block. In still other embodiments, the metadata-location data are stored in another selected memory block.

The metadata-location data comprises information specifying the location of metadata.

In still further embodiments, the metadata-location data include a count value (count-up or count-down information), and the newest metadata-location data are identified by the included count value.

In still further embodiments, if the data storage device looses power, upon power up the newest metadata are first identified on the basis of metadata detected from the last-stored (e.g., newest or prior) metadata-location data and then by the result of scanning of metadata and user data stored after storage of the last-stored metadata-location data.

In still further embodiments, a full page address mapping operation is performed on at least one of the data storage areas.

In still further embodiments, the metadata include the full page address mapping results.

In still further embodiments, the heterogeneous nonvolatile memory cells are different in the number of bits stored per cell.

In still further embodiments, the heterogeneous nonvolatile memory cells are identical in the number of bits storable per cell but are different in the number of logic levels actually used to store data.

In still further embodiments, one of the data storage areas serves as a buffer that temporarily stores input data.

In still further embodiments, the temporarily-stored data are migrated to the other data storage area if the update or access frequency thereof is low; and the data migrated to the other data storage area include user data and the metadata.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Throughout the specification, it will be explained that terms of "write" and "program" have the same meaning.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Figure 1:
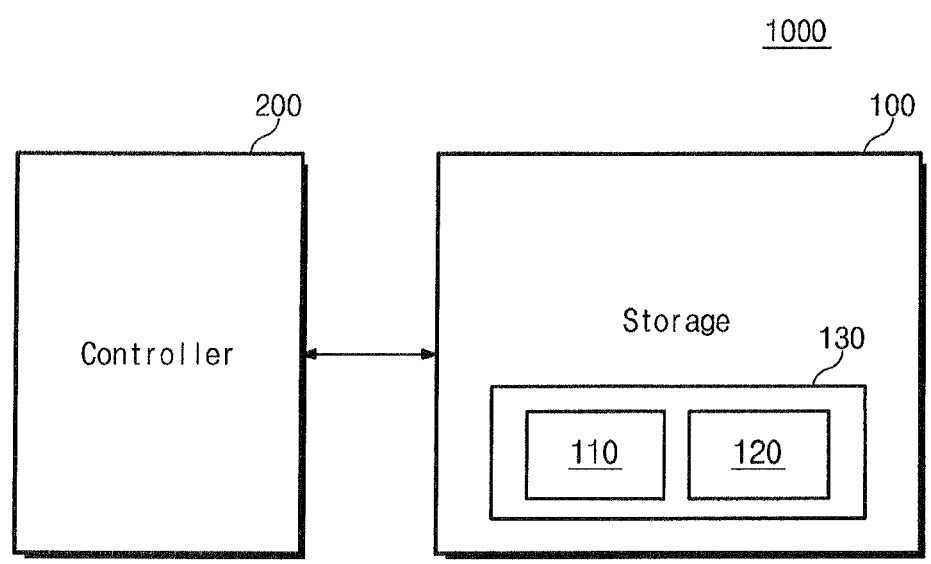
FIG. 1 is a block diagram illustrating a data storage device 100 and a nonvolatile memory system 1000 including the data storage device according to an embodiment of the present invention.

FIG. 1 is a block diagram illustrating a data storage device 100 and a nonvolatile memory system 1000 including the data storage device 100 according to an embodiment of the present invention.

Referring to FIG. 1, a nonvolatile memory system 1000 may include a data storage device 100 and a controller 200. The nonvolatile memory system 1000 illustrated in FIG. 1 may constitute a memory card and/or a memory card system, or a solid state driver/disk (SSD) that uses a nonvolatile memory to store data.

The controller 200 may be configured to communicate with an external device (e.g., a host computer) through one of various interface protocols such as USB, MMC, PCI-E, ATA (Advanced Technology Attachment), Serial-ATA, Parallel-ATA, SCSI, SAS (Serial Attached SCSI), ESDI, and IDE (Integrated Drive Electronics). The controller 200 controls the data storage device 100 when it receives a request (e.g., from a host computer, not shown, connected to the controller 200) for an access to the data storage device 100. For example, the controller 200 controls a read/write/erase operation of the data storage device 100. In addition, the controller 200 manages mapping information of the data storage device 100 so that the host can use the data storage device 100 as a storage medium capable of freely performing a read/write/erase operation like an random access memory (RAM) or a hard disk drive (HDD). The mapping information of the data storage device 100 is managed by an flash translation layer (FTL). The mapping results managed by the FTL are stored in metadata format. According to exemplary embodiments of the present invention, metadata are sequentially stored in each of the memory blocks of the data storage device 100 in a uniformly-distributed manner (instead of being stored only in a specific memory block of the data storage device 100) and memory blocks for data storage are sequentially allocated in a round-robin fashion, which will be described below in detail.

The data storage device 100 is configured with a nonvolatile memory, preferably a flash memory. This is merely exemplary, and those skilled in the art will readily understand that not only a flash memory but also other types of nonvolatile memories are applicable to the present invention.

The data storage device 100 includes a memory cell array 130 including flash memory cells formed in an integrated circuit. The memory cell array 130 may include a first data storage area 110 and a second data storage area 120. The first data storage area 110 and the second data storage area 120 respectively include heterogeneous nonvolatile memory cells having different characteristics. Although only two data storage areas 110 and 120 are illustrated in FIG. 1, various changes may be made in the number and configuration of the data storage areas 110 and 120. For example, the first and second data storage areas 110 and 120 may be separated from or adjacent to each other. Also, at least parts of the first and second data storage areas 110 and 120 may be arranged mixedly in units of cells, pages or blocks. Also, the sizes of the first and second data storage areas 110 and 120 may be fixed or variable.

The following description of the present invention will exemplify a case where the first data storage area 110 includes single-level cells (SLCs) or single-bit cells storing 1-bit data per cell and the second data storage area 120 includes multi-level cells (MLCs), multi-state cells or multi-bit cells storing N-bit data per cell (N: any natural number equal to or greater than 2).

Exemplary embodiments of the present invention implement the first data storage area 110 with SLCs to store "high frequency" random data that will be high in the update or access frequency, and implements the second data storage area 120 with MLCs to store "low frequency" data that will be low in the update or access frequency. In particular, the present invention uses the first data storage area 110 as a kind of buffer memory that temporarily stores user data and/or metadata. Since the first data storage area 110 in the data storage device 100 is limited in terms of the data storage capacity, the low frequency data are migrated to another type of adjacent nonvolatile memory (e.g., the second data storage area 120) during an idle time. This operation is called a data migration operation. A data migration operation is performed under the control of an FTL, and the metadata are updated according to the performance results of the data migration operation. Herein, the high frequency data are called "hot" data and the low frequency data are called "cold" data.

In a write operation on the data storage device 100, the FTL performs an address mapping operation of mapping a logical address generated by a file system to a physical address of a flash memory. A full page address mapping method is used in the present invention. A description will be given of a data storage method and an address mapping operation for the first data storage area 110 in the data storage device 100. An address mapping method for the second data storage area 120 may be identical to or different from an address mapping method for the first data storage area 110. Herein, the full page mapping means that a page mapping method is applied throughout the first data storage area 110.

If metadata generated as a result of full page address mapping are stored in a few specific memory blocks, this may reduce the lifetime of that specific memory block. In the case of full page address mapping, what is essentially required is wear leveling that controls the number of times of erase operations and uniformly distributes the erase operations among all available blocks. The data storage device 100 stores metadata, generated by full page address mapping, in all the memory blocks of the first data storage area 110 in a uniformly-distributed manner, instead of storing the metadata only in a specific memory block. To this end, the data storage device 100 allocates the entire memory blocks of the first data storage area 110 sequentially from the memory block 0 to the memory block N, and stores all of user data, metadata, and metadata-location data for locating the metadata in the allocated memory blocks. The use of a data storage method according to the present invention makes it possible to distribute program erase operations over all the memory blocks (instead of concentrating the program erase operations on only a few specific memory blocks) even when performing a full page address mapping operation. Thus, a separate wear-leveling operation is unnecessary and the lifetime of the data storage device 100 is extended.

Figure 2:
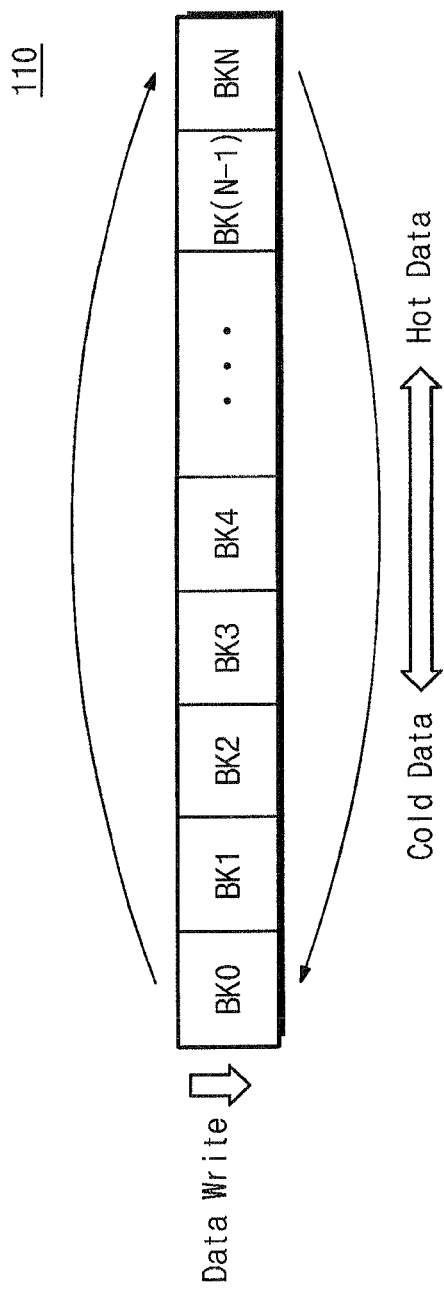
FIG. 2 is a block diagram of the N+1 memory blocks included in a first data storage area 110 of the data storage device 100 of FIG. 1.

FIG. 2 is a block diagram of the N+1 memory blocks included in the first data storage area 110.

Referring to FIG. 2, the first data storage area 110 includes a plurality of N+1 memory blocks BK0 to BKN and each of the memory blocks BK0 to BKN includes a plurality of pages. Although not illustrated in FIG. 2, the second data storage area 120 may also include a plurality of memory blocks like the first data storage area 110. The number of memory blocks included in the first and second data storage areas 110 and 120 is not fixed but variable.

Assuming that the first data storage area 110 includes a total of (N+1) memory blocks (i.e., from the memory block 0 to the memory block N), input data (user data and/or metadata) are sequentially written in the pages one by one beginning from the page 0 of the memory block 0. Thus, the entire plurality of N+1 memory blocks BK0 to BKN are sequentially used in a round-robin fashion as indicated by arched arrows of FIG. 2. In the result, the input data are sequentially written page by page from the memory block 0 (which is called herein after BK0). Upon completion of data writing up to the last memory block N (which is called herein after BKN), data writing is again performed sequentially page by page from the memory block 0 (BK0). Herein, the pages selected in each memory block for data writing may be adjacent to or separate from each other. The selection of pages in the selected memory block may be performed in various formats.

In principle, a flash memory is incapable of data overwriting and its data write unit is different from its data erase unit. Thus, input data (user data and/or metadata) are overwritten not in a previously-selected memory block but in a newly-selected memory block (or in a free page of the previously-selected memory block). These writing characteristics of the flash memory are also applied when updating previously-stored data, as well as when writing new data. Therefore, referring to FIG. 2, the data become colder toward the memory block BK0 and become hotter toward the memory block BKN.

Figure 3:
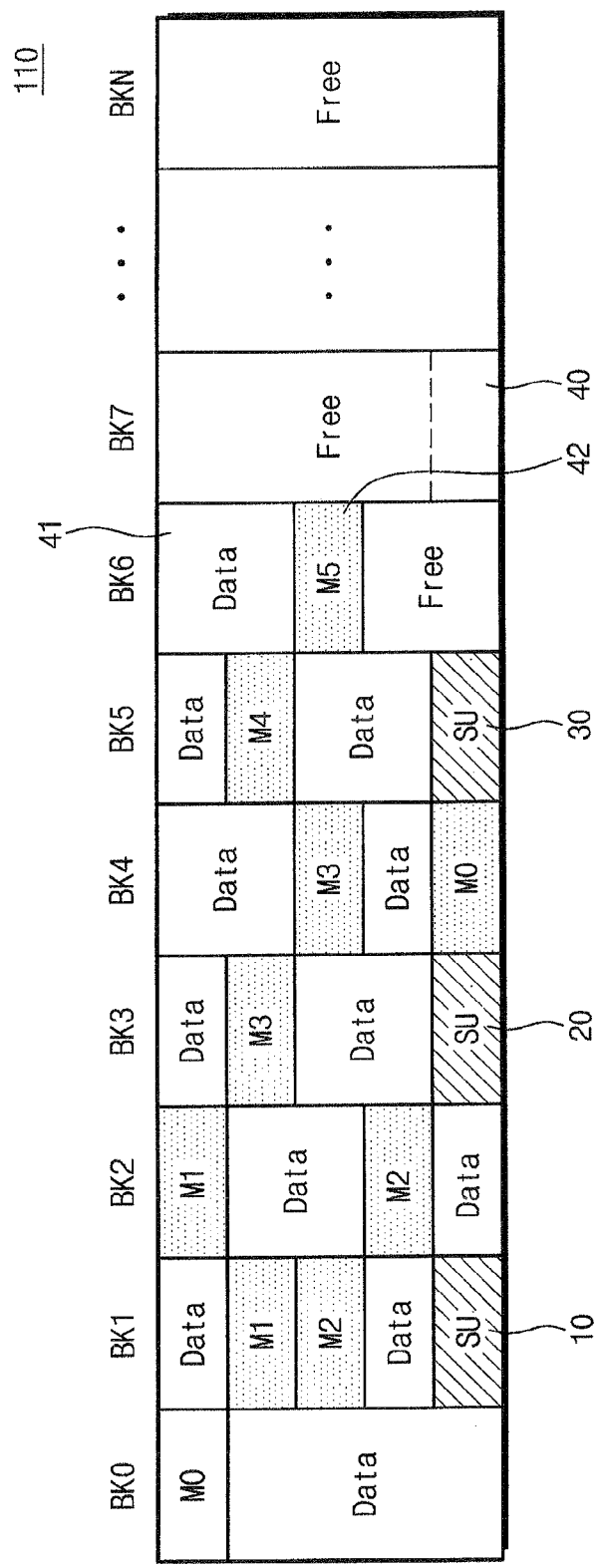
FIG. 3 is a block diagram illustrating an example of the data storage state of the N+1 memory blocks included in the first data storage 110 area as shown in FIG. 2.

FIG. 3 is a block diagram of the N+1 memory blocks of FIG. 2 illustrating an example of the data storage state of the memory blocks in the first data storage area 110.

Referring to FIG. 3, the portions labeled 'Data' represent "user data" and the portions labeled 'M0' to 'M5' represent metadata. The metadata may be FTL data (e.g., address mapping results) or other additional data (e.g., flag data and version data). Also, portions labeled 'SU (Summary Unit) represent data for managing the metadata. The metadata are used to manage the physical locations of the corresponding user data, and the SU data are used to manage the physical locations of the metadata. The location information of the newest metadata is stored in the SU data, which is used to detect in which of the memory blocks BK0 to BKN the newest metadata are written. Thus, if the newest SU data are detected among a plurality of SU data (10, 20, 30, 40 . . . ) written in the first data storage area 110, the newest metadata can be located and thus all of the corresponding user data can be located. It is simple to detect the newest SU data. For example, a value (e.g., an up-count value or a down-count value) is set to increment or decrement whenever SU data are written, and then the SU data smallest or greatest in terms of the set value are detected as the newest SU data.

SU data are written at a fixed location (e.g., the last page in every odd memory block) in a cycle of a predetermined interval (e.g., in a cycle of an i number of blocks wherein i is a natural number)). The writing cycle of the SU data may vary in various formats. FIG. 3 exemplifies a case where SU data are written in a cycle of two blocks (i.e., i=2) wherein SU data are written in (the last page of) every other (e.g., odd) memory block. If SU data are written in a cycle of one block (i.e., i=1), SU data will be stored in every memory block BK0 to BKN.

Referring to FIG. 3, the data storage device 100 sequentially selects the memory blocks BK0 to BKN of the first data storage area 110 in a round-robin fashion, and writes both user data and metadata in the selected memory block. This means that the present invention does not dedicate a specific memory block for metadata storage and does not frequently erase that memory block. Thus, a separate merging or wear-leveling operation is unnecessary and the lifetime of the data storage device 100 is extended.

Meanwhile, during the use of the data storage device 100 including a flash memory, a power-off operation can be normally initiated by a user, or a power-off operation may be suddenly performed due to a serious error during the operation. The former event is called a normal power-off event because it occurs normally by the user, and the latter event is called a sudden power-off event because it occurs suddenly due to an unexpected power error (e.g., a power failure). The data storage device 100 of the present invention is configured to normally recover metadata and user data not only in the case of the normal power-off event but also in case of a sudden power-off event. A data recovery method according to the present invention is as follows.

After SU data 30 are written at a specific location and before the next SU data 40 are written, the power may be turned OFF after only user data 41 and metadata 42 are written in the memory block BK6. In this case, if the power is turned ON again, the FTL first detects the newest SU data 30 in the data storage device 100. Thereafter, the FTL detects the location of metadata written in the detected newest SU data 30 and loads the metadata stored at the detected location into a working memory (e.g., an SRAM) of the controller 200. Thereafter, the FTL checks if there are user data and metadata written after the loaded newest SU data 30. To this end, the FTL performs a scanning operation from the immediately next page, in which the newest SU data 30 are stored, to a page 40 in which the next SU data 40 are to be written. If the user data 41 and the metadata 42 are detected during the scanning operation, the metadata loaded into the memory are updated to recover the newest metadata state. Through this process, the metadata stored in the first data storage area 110 in a distributed manner can be read and written accurately.

As described above, the data storage device 100 writes both of user data and metadata in the sequentially-selected memory blocks from memory block BK0 to memory block BKN, and writes SU data for management of the metadata in the memory blocks in a predetermined cycle (e.g., I=1, 2 . . . ). According to this data storage method, metadata are distributed and stored throughout the data storage area (instead of being concentrated on a specific block). Therefore, it is unnecessary to perform a wear-leveling operation that scatters data and a merging operation that collects scattered data. Also, it is possible to accurately recover the newest metadata and user data not only in the case of a normal power-off event but also in the case of a sudden power-off event.

In the above, a description has been given of an exemplary case where the first data storage area 110 of the data storage device 100 includes SLCs and the second data storage area 120 includes MLCs. However, it is not necessarily that the memory cells of the first and second storage areas 110 and 120 include SLCs and MLCs. For example, the first and second storage areas 110 and 120 may include homogeneous MLCs and may be different in the number of pages therein. Assuming that both of the first and second data storage areas 110 and 120 include 2-bit MLCs storing four logic levels per cell, the MLC of the first data storage area 110 may use only the upper (or lower) levels data (thus storing only 1 bit of data) and the MLC of the second data storage area 120 may use every logic level (e.g., four logic levels) thus storing 2 bits per cell. In this case, the MLC of the first data storage area 110 operates as a 1-bit SLC and the MLC of the second data storage area 120 operates as a normal 2-bit MLC. As described above, even when the first and second data storage areas 110 and 120 include homogeneous MLCs, they can operate as heterogeneous memory cells if the number of actually used bits is adjusted. Also, the above-described operation characteristics of the data storage device 100 can be applied even in such a configuration.

Figure 4:
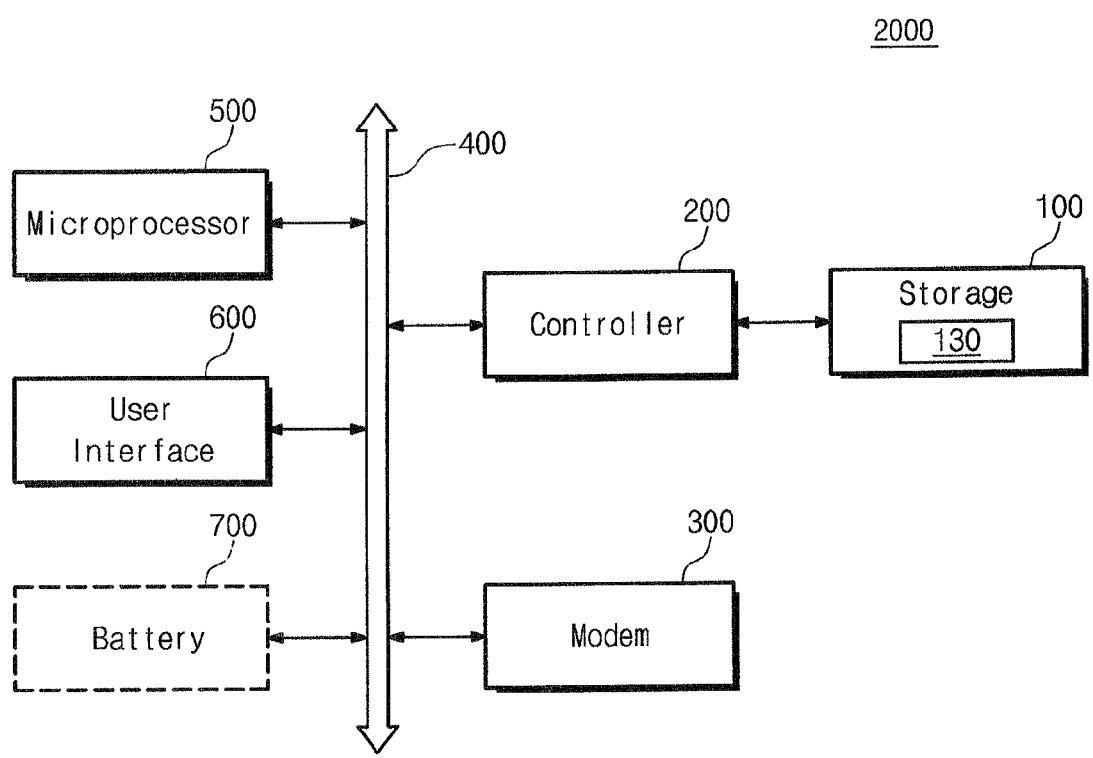
FIG. 4 is a block diagram of a computing system including the data storage device according to an embodiment of the present invention.

FIG. 4 is a block diagram of a computing system 2000 including the data storage device 100 according to an embodiment of the present invention.

Referring to FIG. 4, a computing system 2000 according to an embodiment of the present invention includes a data storage device 100, a controller 200, a modem 300 such as a RF baseband chipset, a microprocessor (CPU) 500, and a user interface 600 that are electrically connected to a system bus 400.

N-bit data (wherein N is a natural number), which is to be processed by the microprocessor 500, are stored in the data storage device 100 through the controller 200. For example, the controller 200 and the data storage device 100 may constitute a solid state driver/disk (SSD) that uses a nonvolatile (flash) memory to store data. The configuration of the data storage device 100 illustrated in FIG. 4 is substantially the same as that illustrated in FIG. 1. According to the data storage method and the data management method described above, the data storage device 100 allocates memory blocks and stores user data, metadata, and SU data. The data storage device 100 sequentially allocates memory blocks in a round-robin fashion. Thus, it is unnecessary to perform a wear-leveling operation that scatters data and a merging operation that collects scattered data.

If the computing system 2000 is a mobile device, it may further include a battery 700 for supplying the operating (power supply) voltage of the computing system 2000. Although not illustrated in FIG. 4, those skilled in the art will readily understand that the computing system 2000 may further include an application chipset, a camera image processor (CIS), and a mobile DRAM. The recent market trend is that data storage devices using heterogeneous nonvolatile memories are mounted in notebook computers, desktop computers, and server devices. In this market condition, the present invention greatly improves the performance, thus making it possible to accelerate the widespread use of data storage devices using nonvolatile memories as hard disk drive replacements.

According to the present invention as described above, the memory blocks of the data storage device can be sequentially used and the user data and the metadata can be stored in a uniformly (e.g., sequentially)-distributed manner. Therefore, separate merging/wear-leveling operations are unnecessary. Thus, it is possible to improve the lifetime and writing performance of a data storage device using at least two or more heterogeneous nonvolatile memories.

The above described exemplary embodiments is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description of exemplary embodiments.

What is claimed is:

1. A data storage device comprising:
a first data storage area configured to store one bit of data using single-level cells (SLCs) in a nonvolatile memory cell array; and
a second data storage area configured to store at least two bits of data using multi-level cells (MLCs) in the nonvolatile memory cell array,
wherein the first data storage area comprises a plurality of memory blocks to be selected in a predetermined order and configured to store user data and metadata corresponding to the user data, and
wherein the user data and the metadata are written into a same memory block while it is a currently-selected memory block, and wherein meta-management data used to manage physical locations of the metadata is written into the currently-selected memory block if a previous memory block excludes meta-management data,
wherein the meta-management data comprise count-up or count-down information, and the newest meta-management data are identified by the count-up or count-down information,
wherein if the data storage device is rebooted, the newest metadata are generated on the basis of metadata detected from the newest meta-management data and scanning results of metadata and user data stored after storage of the newest meta-management data.

2. The data storage device of claim 1, wherein the predetermined order is in a sequential selection in a round-robin fashion.

3. The data storage device of claim 1, wherein the meta-management data are stored in the currently- selected memory block in a predetermined cycle.

4. The data storage device of claim 1, wherein a full page address mapping operation is performed on at least one of the first data storage area and the second data storage area.

5. The data storage device of claim 4, wherein the metadata comprise the full page address mapping results.

6. The data storage device of claim 1, wherein the first data storage area serves as a buffer that temporarily stores the user data before it is written into the second data storage area.

7. The data storage device of claim 6, wherein the temporarily-stored user data and the metadata are migrated to the second data storage area if the update or access frequency of the user data is lower than a predetermined frequency.

8. The data storage device of claim 1, wherein the meta-management data is written into a different one of the memory blocks if the previous memory block includes meta-management data.

9. A memory system comprising:
a data storage device having a first data storage area configured to store one bit of data and a second data storage area configured to store at least two bits of data in a nonvolatile memory cell array; and
a controller configured to control the data storage device,
wherein the first data storage area comprises a plurality of memory blocks that are sequentially selected to store user data and metadata corresponding to the user data in a predetermined order, and
wherein the controller is configured to write the user data and the metadata together into a selected one of the memory blocks, and write meta-management data used to manage the locations of the metadata into the selected memory block if a previous memory block excludes meta-management data,
wherein the meta-management data comprise count-up or count-down information, and the newest meta-management data are identified by the count-up or count-down information,
wherein if the data storage device is rebooted, the newest metadata are generated on the basis of metadata detected from the newest meta-management data and scanning results of metadata and user data stored after storage of the newest meta-management data.

10. The memory system of claim 9, wherein the predetermined order is in a round-robin fashion.

11. The memory system of claim 9, wherein the controller is configured to write the meta-management data into a different one of the memory blocks if the previous memory block includes meta-management data.

12. The memory system of claim 9, wherein the first data storage areas serves as a buffer that temporarily stores the user data.

13. A method for controlling a nonvolatile data storage device having a first data storage area configured to store at least one bit of data and a second data storage area in a nonvolatile memory array, said method comprising:

sequentially selecting among a plurality of memory blocks in the first data storage area; and writing first user data in the currently-selected memory block;

writing first metadata corresponding to the first user data adjacent to the first user data into the same currently-selected memory block; and writing meta-management data used to manage locations of the first metadata into the same currently-selected memory block if a previous memory block excludes meta-management data, wherein the meta-management data comprise count-up or count-down information, and the newest meta-management data are identified by the count-up or count-down information, wherein if the data storage device is rebooted, the newest metadata are generated on the basis of metadata detected from the newest meta-management data and scanning results of metadata and user data stored after storage of the newest meta-management data.

14. The method of claim 13, wherein the sequentially selecting among a plurality of memory blocks in the first data storage area comprises selecting in a round-robin fashion.

15. The method of claim 13, further comprising:

writing second user data into the same currently-selected memory adjacent to the first metadata; and writing second metadata corresponding to the second user data adjacent to the second user data into the same currently-selected memory block, wherein the meta-management data includes exact-location information of the first metadata and of the second metadata.

16. The method of claim 15, wherein the meta-management data is located in a last page of the same currently-selected memory block.

17. The method of claim 15, wherein the metadata includes flash translation layer FTL data.

18. The method of claim 13, further comprising writing the meta-management data into a different one of the memory blocks if the previous memory block includes meta-management data.

* * * * *